(12) United States Patent
Zeugner (10) Patent No.: US 7,086,685 B1
(45) Date of Patent: Aug. 8, 2006

(54) PICKUP TRUCK BED COVER

(76) Inventor: Scott J. Zeugner, 205 W. Country Dr., Bartlett, IL (US) 60103

( * ) Notice: Subject to any disclaimer, the term of this patent is extended or adjusted under 35 U.S.C. 154(b) by 0 days.

(21) Appl. No.: 11/091,275

(22) Filed: Mar. 28, 2005

(51) Int. Cl.
*B60P 7/04* (2006.01)

(52) U.S. Cl. .......................... 296/100.15; 296/100.16; 296/136.1; 296/100.01

(58) Field of Classification Search ................... 296/98, 296/100.01, 100.11, 100.15, 100.16, 136.01, 296/136.03, 136.04, 136.07, 136.1; 135/88.01, 135/88.03, 88.07; 150/166
See application file for complete search history.

(56) References Cited

U.S. PATENT DOCUMENTS

| | | | |
|---|---|---|---|
| 2,465,621 A | | 3/1949 | Wheeler |
| 2,479,280 A | | 8/1949 | Tuerk |
| 2,581,985 A | | 1/1952 | Tuerk |
| 2,889,171 A | | 6/1959 | Morris |
| 2,969,284 A | | 1/1961 | Ambli |
| 3,202,454 A | | 8/1965 | Neidlinger |
| 3,481,371 A | * | 12/1969 | Lawrence .................. 139/419 |
| 3,521,927 A | | 7/1970 | Barry |
| 3,614,154 A | | 10/1971 | Evans |
| 3,615,117 A | | 10/1971 | Neidlinger |
| 3,882,575 A | | 5/1975 | Jolly |
| 4,484,777 A | | 11/1984 | Michel |
| 4,526,416 A | * | 7/1985 | Rode ...................... 296/100.16 |
| 4,824,162 A | | 4/1989 | Geisler et al. |
| 4,948,191 A | | 8/1990 | Cao |
| 4,968,085 A | | 11/1990 | Stann |
| 5,050,924 A | | 9/1991 | Hansen |
| 5,299,849 A | * | 4/1994 | Cook et al. ............ 296/100.15 |
| 5,431,474 A | * | 7/1995 | Burkey .................. 296/100.15 |
| 5,620,040 A | | 4/1997 | Swanner |
| 6,003,929 A | | 12/1999 | Birdsell |
| 6,224,139 B1 | * | 5/2001 | Weyand ................. 296/100.16 |
| 6,302,469 B1 | * | 10/2001 | Jones .................... 296/100.16 |
| 6,398,287 B1 | * | 6/2002 | Smith et al. ........... 296/100.01 |
| 6,527,318 B1 | * | 3/2003 | Kolper ....................... 293/126 |
| 6,575,520 B1 | * | 6/2003 | Spencer ................. 296/100.15 |
| 6,783,315 B1 | * | 8/2004 | Senechal .................... 414/462 |

* cited by examiner

*Primary Examiner*—D. Glenn Dayoan
*Assistant Examiner*—Greg Blankenship
(74) *Attorney, Agent, or Firm*—Kalim S. Fuzail; Fuzail & Associates (57) ABSTRACT

A pickup truck bed cover comprising (a) a flexible sheet dimensioned to overlap the pickup truck bed and having four draped portions extending downwardly along each of two sidewalls, end wall and tailgate enclosing the pickup truck bed, (b) an anchoring means to secure the cover to the pickup truck, and (c) a tension distribution channel to distribute force produced when the anchoring means is pulled tautly.

14 Claims, 9 Drawing Sheets

FIG. 9

PICKUP TRUCK BED COVER

FIELD OF THE INVENTION

A pickup truck bed cover comprising (a) a flexible sheet dimensioned to overlap the pickup truck bed and having four draped portions extending downwardly along each of two sidewalls, end wall and tailgate enclosing the pickup truck bed, (b) an anchoring means to secure the cover to the pickup truck, and (c) a tension distribution channel to distribute force produced when the anchoring means is pulled tautly.

BACKGROUND OF THE INVENTION

For aesthetic, safety and legal reasons, the contents placed on an open and exposed bed of a truck should be covered. In fact, there are numerous ordinances and laws in jurisdictions throughout the United States which require the covering of loads.

The most common of these covers is the tonneau cover, which is usually constructed from flexible materials such as leather or vinyl fabric and secured to the bed of the truck, above the floor and usually at the top of the bed walls, by grommets, elastic cords, and the like. These flexible covers are usually secured in place by tie-down ropes extending from eyelets or patches on the four draped sides.

U.S. Pat. No. 3,614,154 discloses a flexible sheet cover material for an open top vehicle wherein the cover edges have edge stiffeners which in combination with tie down cords serve to hold the cover in place. The stiffeners at the cover edges while held under tension in the horizontal position by the tie down cords secured to the stiffeners at fixed points, distribute the stress over a wide area of the cover edges.

U.S. Pat. No. 4,968,085 discloses a truck bed cover for covering loads of varying height. The cover includes a generally rectangular center section of a size adapted to cover the truck bed, surrounded by four outwardly-extending panels or flaps. Each of the flaps is provided with a series of connectors designed to mate with compatible elements located on the truck bed sides. The connectors are arranged on the panels such that the panels may be folded to provide various effective heights for the cover, the folded portions of the panels being maintained in position by complementary fasteners located on the cover.

U.S. Pat. No. 5,431,474 discloses a flexible vehicle cargo cover that has either a single, cord, cable, or strap (or a plurality thereof) which are either housed within a seam that is attached to the perimeter of the cover or are otherwise attached to the perimeter of the cover or are otherwise attached to the cover at the perimeter which includes a plurality of flexible arches that are attached in a concave manner to at least two sides of the cover.

While flexible covers disclosed in the above patents cover the pickup truck bed, they all have certain shortcomings such a tearing under stress. One commonly encountered stress is the stress produced from the downward force which tends to push the cover down into the pickup truck bed from the weight of rain and snow loads. Another commonly encountered stress is the stress produced from the upward force which lifts the cover off the pickup truck bed due to high winds experienced at high transit speeds. Yet another stress commonly encountered is the stress produced when the cover is stretched over the bed of the pickup truck and fastened to the pickup truck body by the tie down straps.

What is needed is a pickup truck bed cover which can distribute these various stresses over the entire surface of the cover to minimize localized stressing which leads to tears.

SUMMARY OF THE INVENTION

The present invention provides a pickup truck bed cover comprising (a) a flexible sheet, the flexible sheet having a horizontal portion dimensioned so as to overlap an opening defined by two substantially vertical sidewalls, a substantially vertical end wall and a substantially vertical tailgate of a pickup truck, and the flexible sheet further having four substantially vertical draped portions extending downwardly along each of the sidewalls, end wall and tailgate, (b) a tension distribution channel running around the perimeter of the horizontal portion and diagonally down to each corner of the four substantially vertical draped portions of the flexible sheet forming four V-like formations at each of four corners, the tension distribution channels running diagonally down meeting at an apex at each of the four corners, and (c) an anchoring means having a first and second end portion, the first end portion attached to the apex of the tension distribution channel, and a connecting means attached to the second end portion, wherein the anchoring means has an adjustable length to increase or decrease force with which the flexible sheet overlaps the opening of the pickup truck bed, and wherein the connecting means is removably affixed to the pickup truck, and further wherein the tension distribution channel distributes force produced when the anchoring means is pulled tautly between the apex and the connecting means.

BRIEF DESCRIPTION OF THE DRAWINGS

The features of this invention will be understood more fully and clearly apparent from the following description made in connection with the accompanying drawings wherein like reference numbers and characters refer to similar parts throughout the several views, and in which.

DETAILED DESCRIPTION OF THE INVENTION

Figure 1:
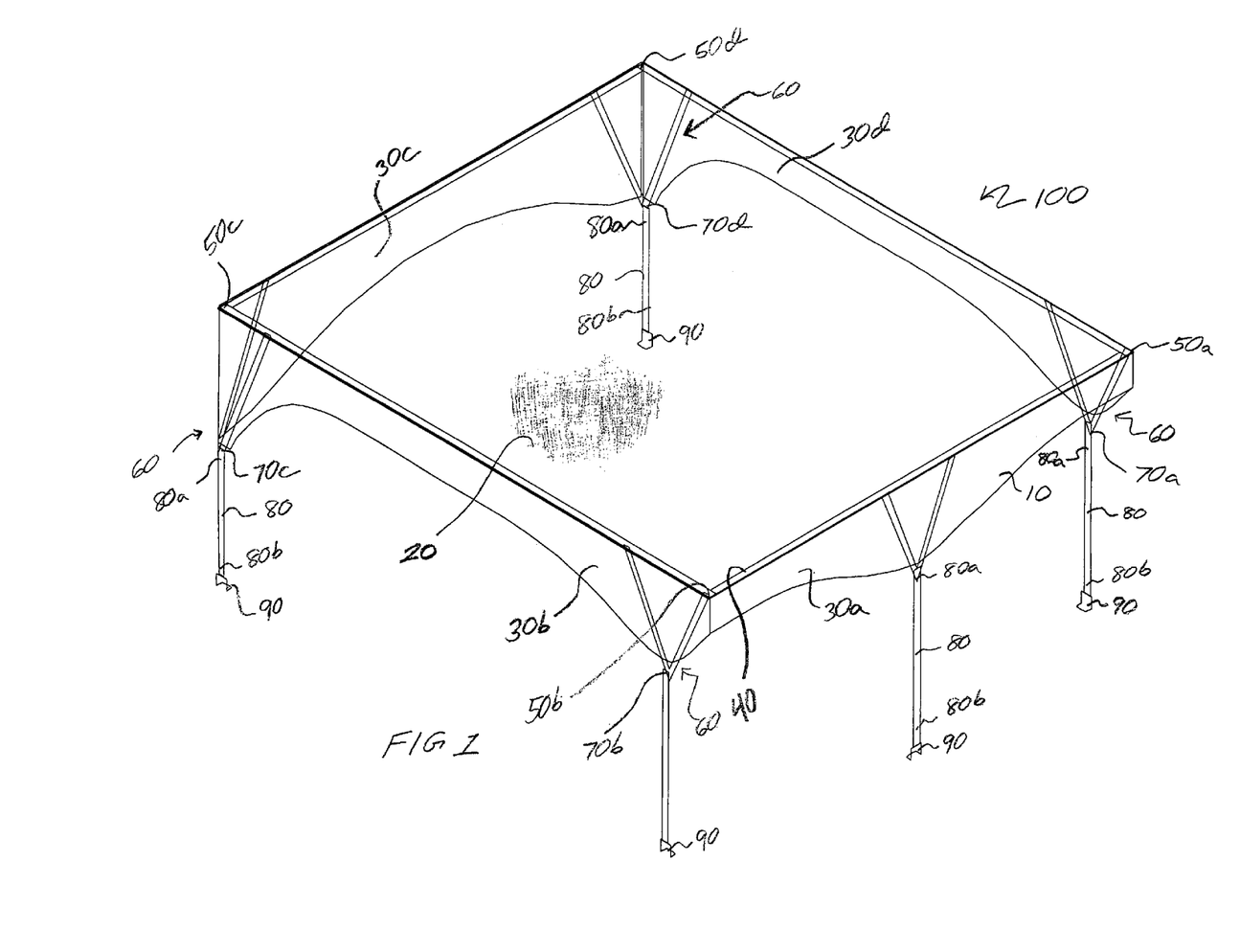
FIG. 1 is a perspective view of the flexible bed cover.
Figure 2:
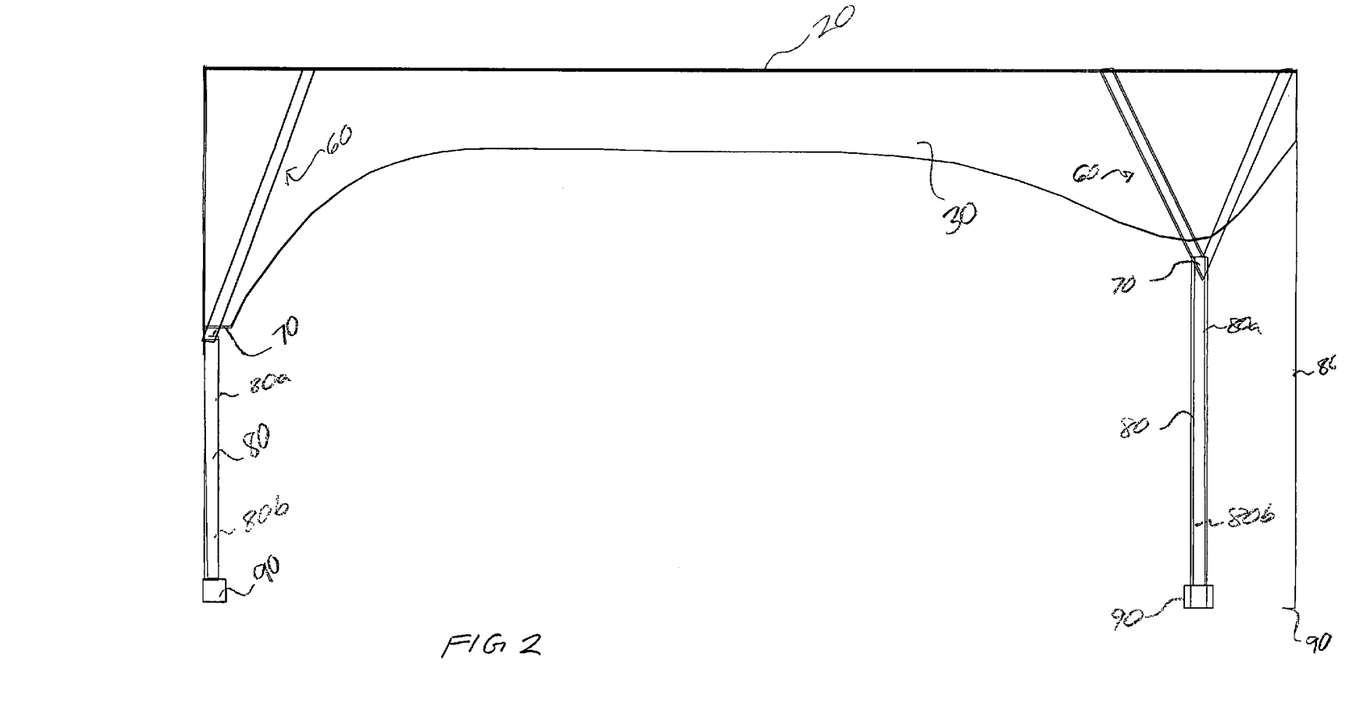
FIG. 2 is a side elevational view of the flexible bed cover.
Figure 3:
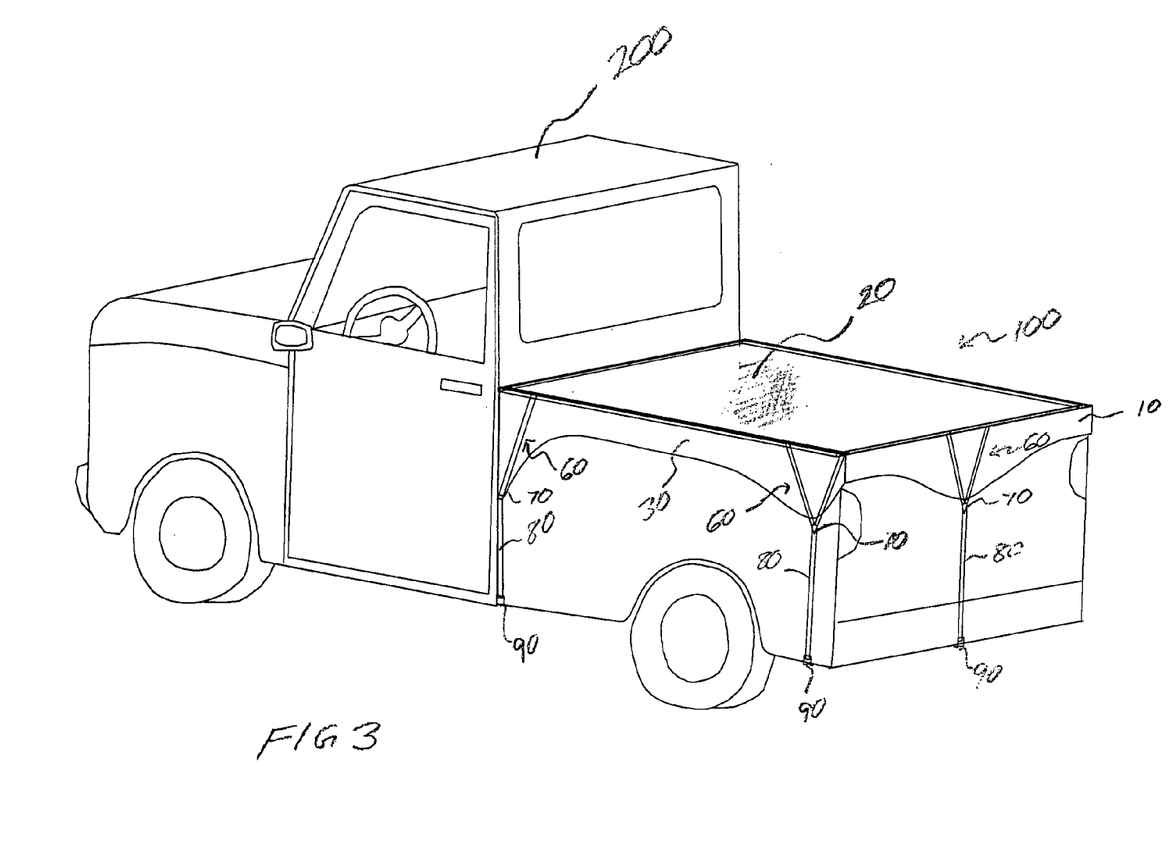
FIG. 3 is a perspective view of the flexible bed cover attached to a bed of a pickup truck.
Figure 7:
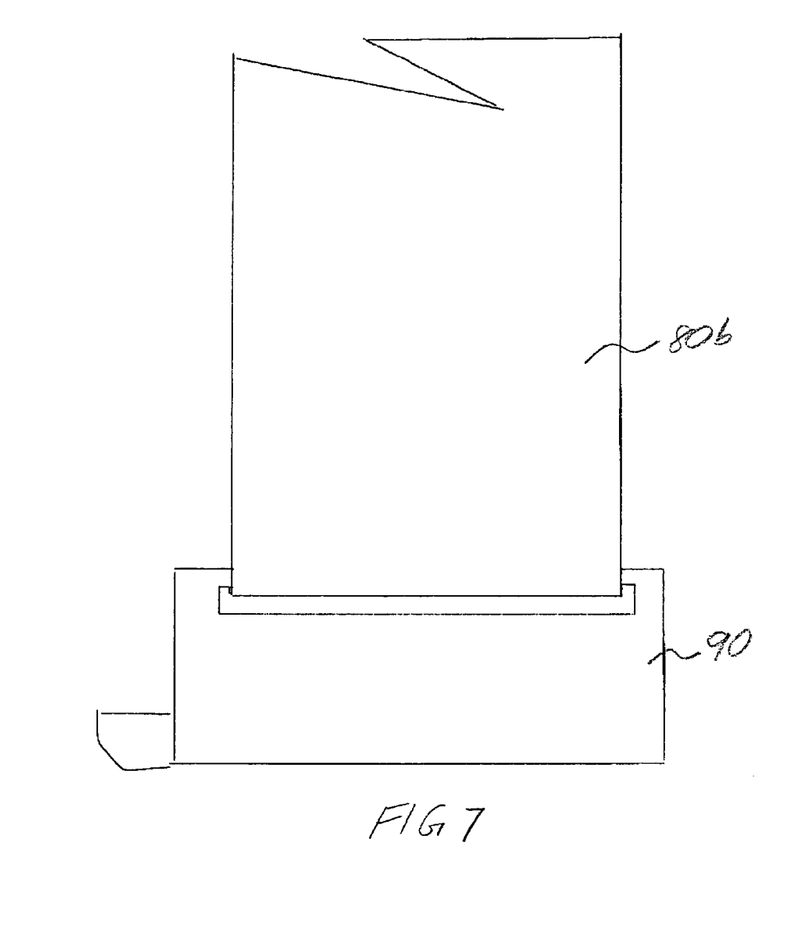
FIG. 7 is a perspective view of the anchoring and connecting means.
Figure 8:
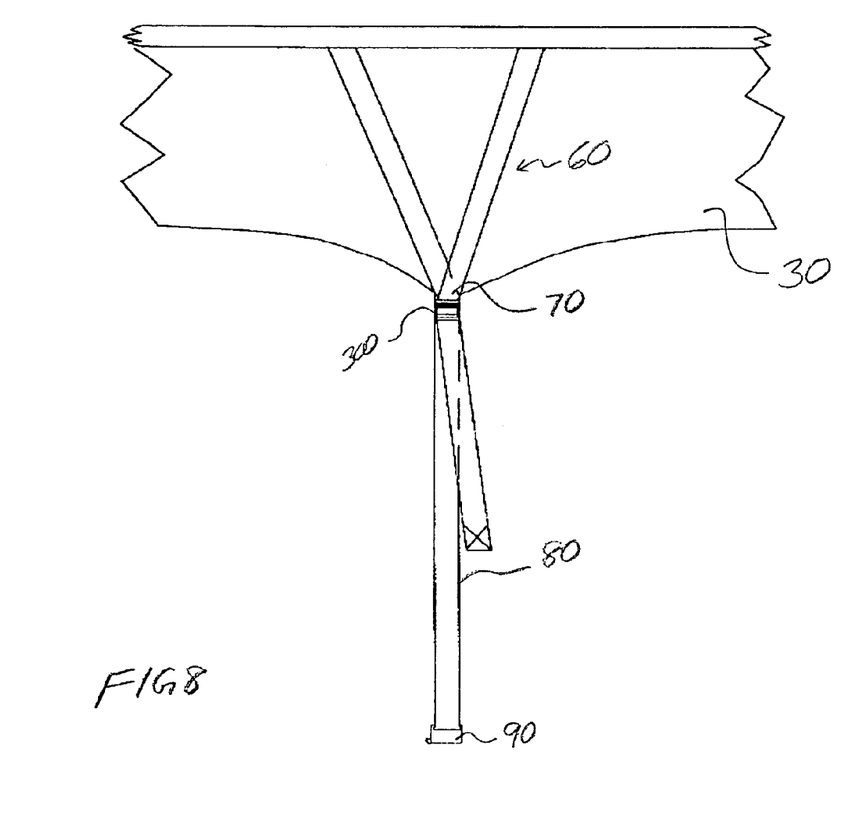
FIG. 8 is a side elevational view of the bed cover, v-like formation, adjuster, anchoring and connecting means.
Figure 9:
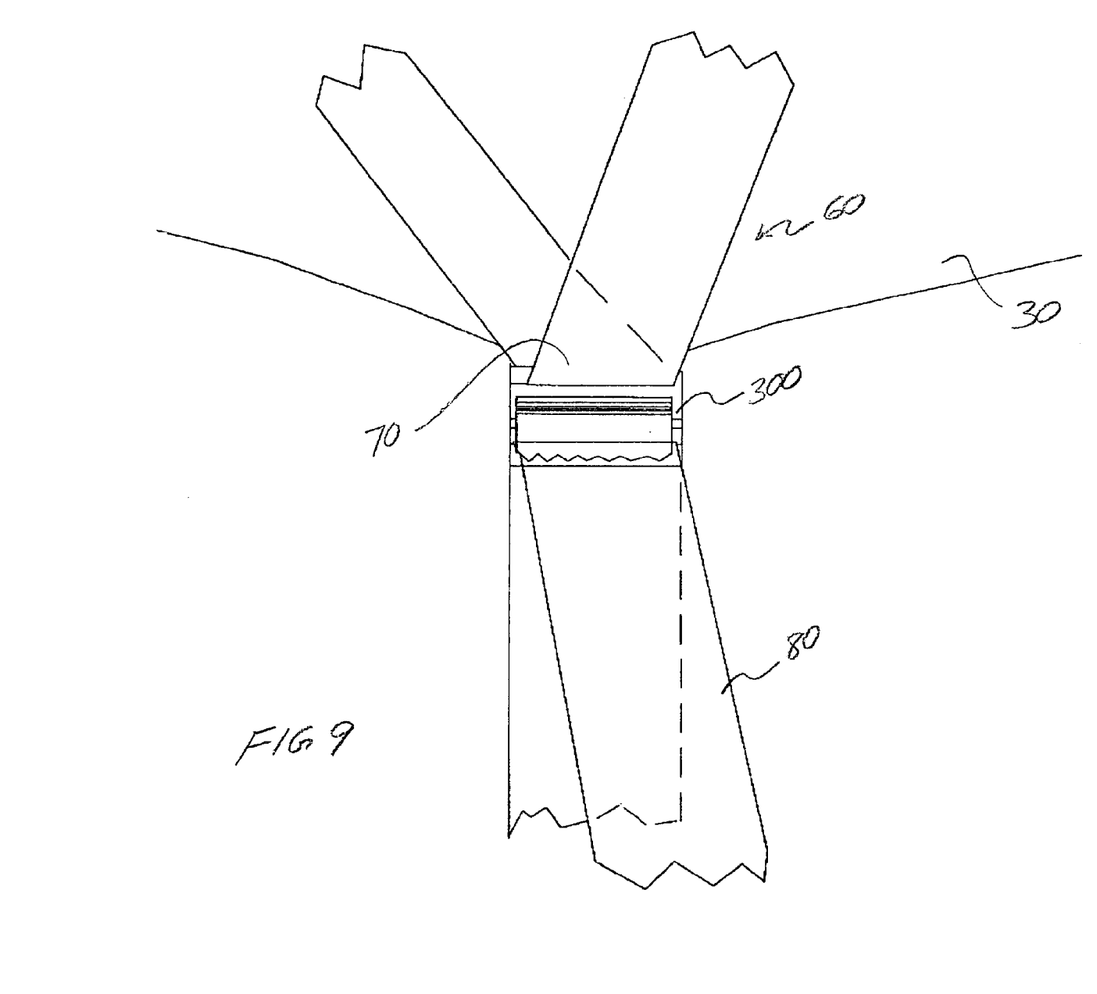
FIG. 9 is a front elevational view of the adjuster.

Turning now to the drawings, and particularly to FIGS. 1, 2 and 8 what is shown is a first embodiment of the pickup truck bed cover 100 comprising a flexible sheet 10, the flexible sheet 10 having a horizontal portion 20 dimensioned so as to overlap an opening defined by two substantially vertical sidewalls, a substantially vertical end wall and a substantially vertical tailgate of a pickup truck, and the flexible sheet 10 further having four substantially vertical draped portions 30a, 30b, 30c and 30d (generally identified as 30) extending downwardly along each of the sidewalls, end wall and tailgate. A tension distribution channel 40 runs about the perimeter of the horizontal portion 20 of the flexible sheet 10 and diagonally down to at least each corner 50a, 50b, 50c and 50d (generally identified as 50) of the four substantially vertical draped portions 30a, 30b, 30c and 30d of the flexible sheet 10 forming at least four V-like formations 60 at each of the four corners 50a, 50b, 50c and 50d, the tension distribution channel running diagonally downward meeting at apex 70a, 70b, 70c and 70d (generally identified as 70) at each of the four corners 50a, 50b, 50c and 50d. Attached to each apex 70a, 70b, 70c and 70d of the tension distribution channel 40 is the first end portion 80a of an anchoring means 80. The second end portion 80b of the anchoring means 80 is attached to a connecting means 90 which can be removably affixed to the body or underside of a pickup truck 200 as shown in FIGS. 3 and 7. The length 80c of the anchoring means 80 can be adjusted by adjuster 300 to increase or decrease force with which the flexible sheet 10 is held on to the opening of the pickup truck bed as shown in FIGS. 8 and 9. The tension distribution channel 40 distributes the force produced when the length 80c of the anchoring means 80 is decreased between each apex 70a, 70b, 70c and 70d and the connecting means 90.

Figure 4:
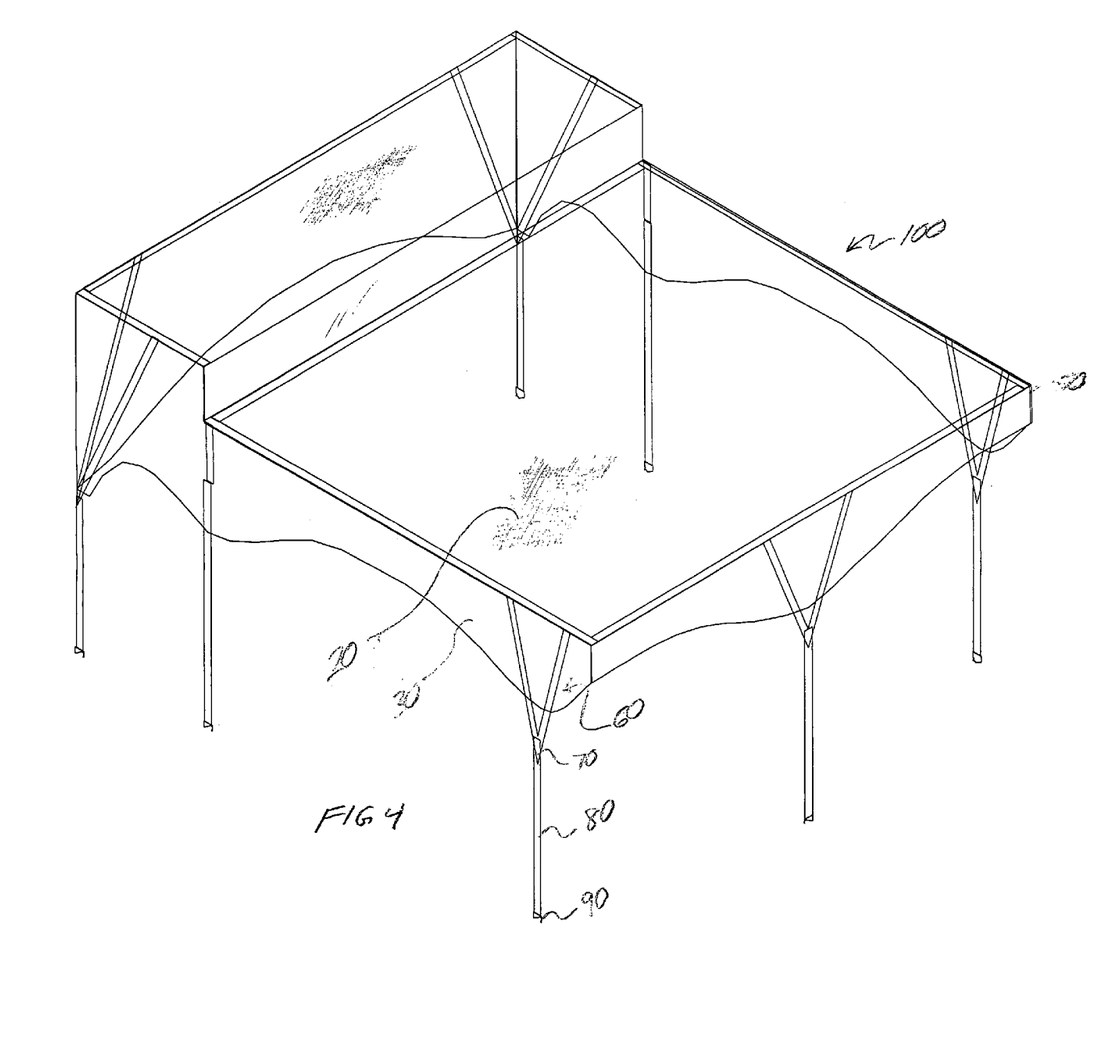
FIG. 4 is a perspective view of the flexible bed cover configured to fit over a bed-mounted toolbox.
Figure 5:
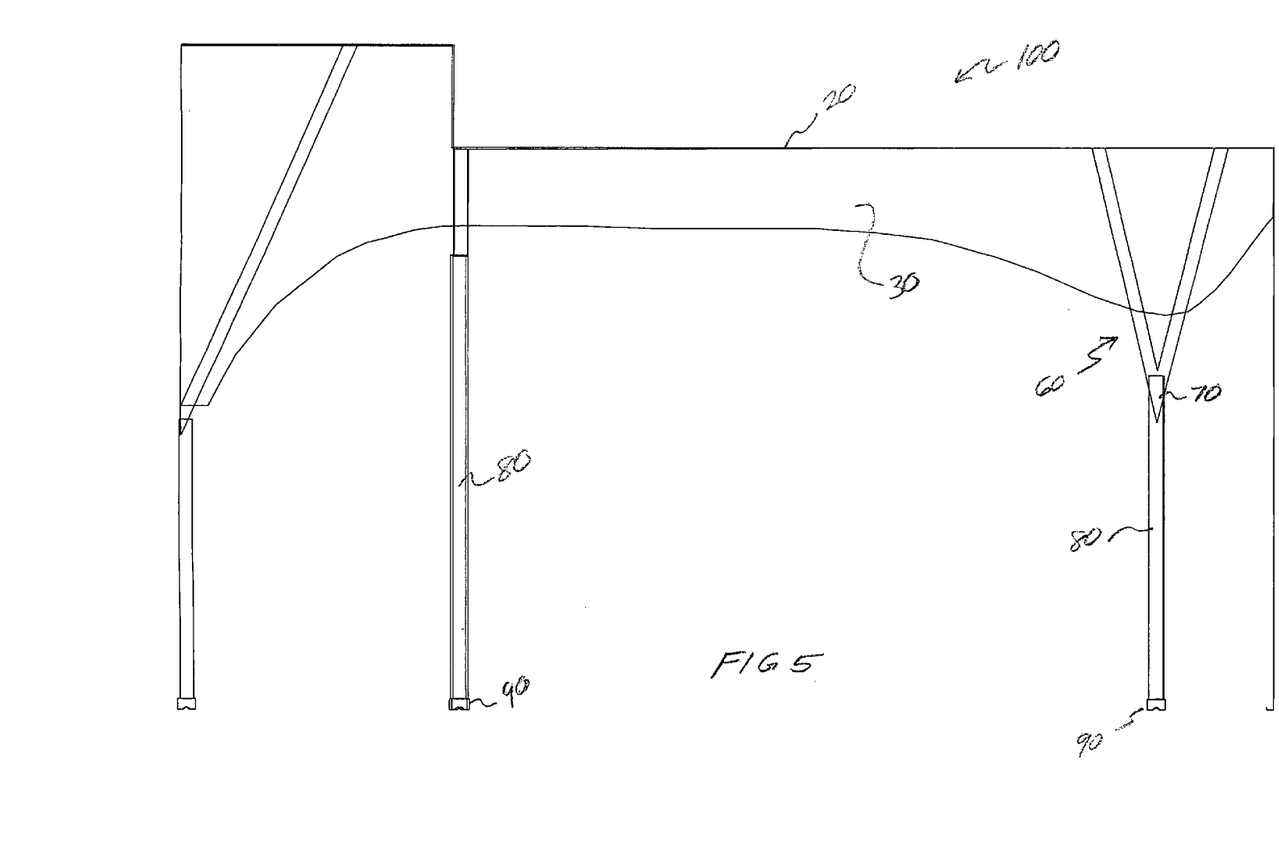
FIG. 5 is a side elevational view of the flexible bed cover configured to fit over a bed-mounted toolbox.
Figure 6:
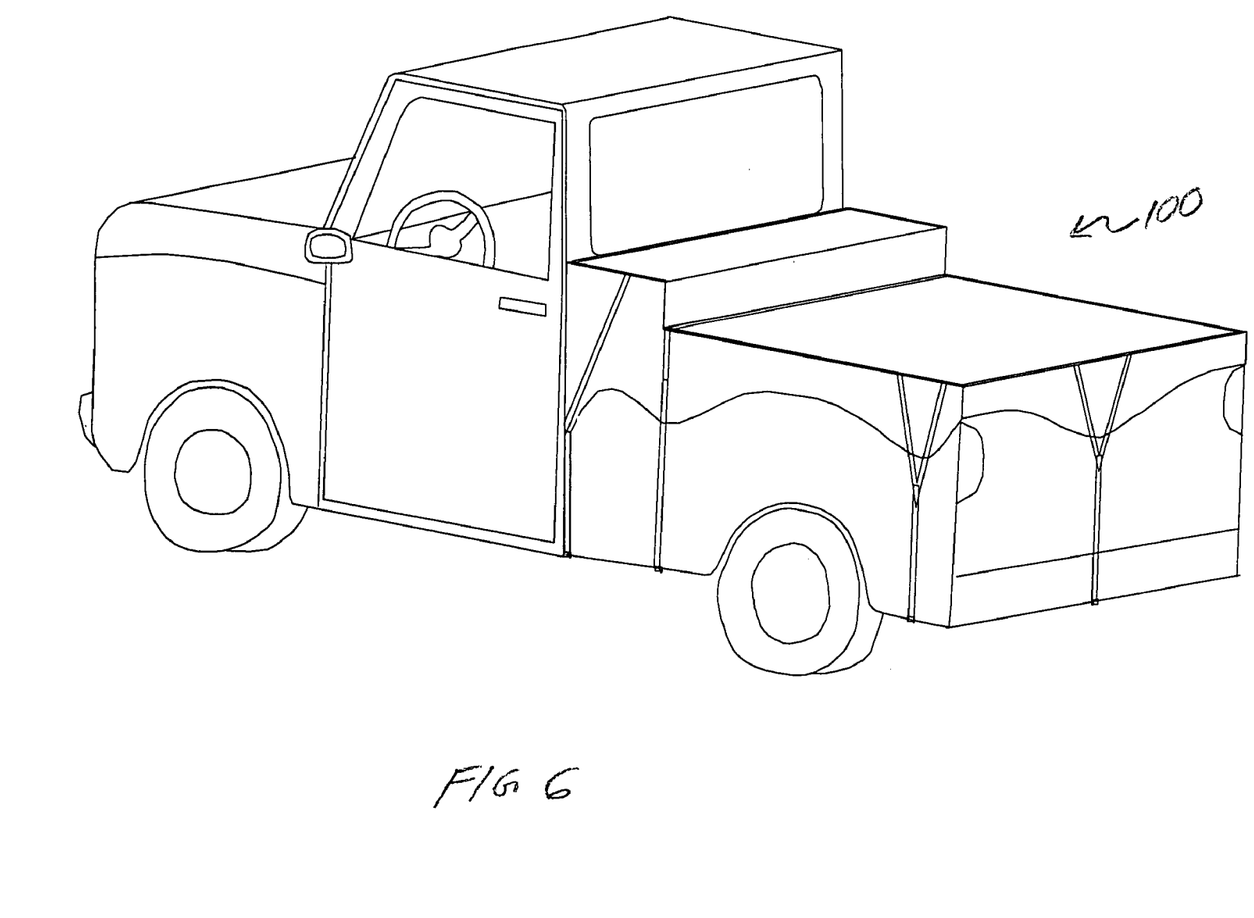
FIG. 6 is a perspective view of the flexible bed cover attached to a pickup truck having a bed-mounted toolbox.

In a second embodiment, shown in FIGS. 4 and 5, the pickup truck cover bed cover 100 configured to accommodate a bed-mounted toolbox. FIG. 6 shows the bed cover of the second embodiment secured to a pickup truck 200.

Flexible Sheet

The flexible sheet 10 can be constructed from a material selected from canvas, vinyl, leather, plastic, nylon, polyethylene glycol terephthalate resin, rayon and the like or any combination of said materials. The aforementioned materials can be treated to be water resistant or fire retardant. In a preferred embodiment, the flexible sheet is constructed of vinyl. The length and width of the flexible sheet can be varied to accommodate pickup trucks manufactured by companies such as for example, but not limited thereto, Ford, Chevrolet, GMC, Nissan, Toyota, and Mitsubishi.

Tension Distribution Channel

The tension distribution channel 40 can be constructed a material selected from canvas, vinyl, leather, plastic, nylon, polyethylene glycol terephthalate resin and rayon and the like or any combination of said materials. In a preferred embodiment, the tension distribution channel 40 is constructed from nylon. The aforementioned materials can be treated to be water resistant or fire retardant.

The tension distribution channel 40 can be affixed to the flexible sheet 10 by an adhesive, heat melting or stitching the channel directly to the sheet.

Anchoring Means

The anchoring means 80 can be constructed from a material selected from canvas, vinyl leather, plastic, nylon, polyethylene glycol terephthalate resin and rayon and the like or any combination thereof.

In one embodiment, anchoring means 80 is integrally formed as part of the tension distribution channel 40 and continues downwardly extending from each apex 70a, 70b, 70c and 70d. The length 80c of the anchoring means 80 can be adjusted using adjuster 300 to increase or decrease force with which the flexible sheet 10 is held on to the opening of the pickup truck bed.

Connecting Means

The connecting means 90 can be constructed from material selected from metal, plastic or any other material which is resilient to breakage or deformation under high stress conditions. In one embodiment, the connection means 90 is a hook like structure formed to attach the underside of the pickup truck. However, the connecting means can also be configured to attach to any type of anchoring devices affixed to the side or underside of the pickup truck.

In another embodiment, the pickup truck bed cover 100 shown in FIGS. 1–6 further comprises magnets affixed to at least one of the four substantially vertical draped portions 30a, 30b, 30c and 30d of the flexible sheet 10. The magnets attach to the metal body panels of the pickup truck further securing the pickup truck bed cover 100 to the pickup truck 200.

It is to be understood that although this invention is illustrated in conjunction with a pickup truck bed, it is not limited thereto as it can be adapted readily for use in covering boats, buildings, and other objects which have an open surface that must be closed to protect the interior thereof from the weather or other elements.

Adjuster

The adjuster 300 can be constructed from plastic or metal, and allows for the adjustment of the length of the anchoring means. It is similar to the adjusting means found on a back-pack to adjust the length of the straps.

In practice, horizontal portion 20 of the pickup truck bed cover 100 is laid over the pickup truck bed which is an opening defined by two substantially vertical sidewalls, a substantially vertical end wall and a substantially vertical tailgate of a pickup truck. The four substantially vertical draped portions 30a, 30b, 30c and 30d are extended downwardly along each of the sidewalls, end wall and tailgate. The cover is secured to the pickup truck by adjusting the length of the anchoring means 80 using adjuster 300. The connecting means 90 is then removably affixed to the body or underside of a pickup truck 200. To tighten the bed cover onto the pickup truck, the length of the anchoring means 80 can be adjusted by adjuster 300 to increase or decrease force with which the flexible sheet 10 is held on to the opening of the pickup truck bed. The tension distribution channel 40 distributes the force produced when the length 80c of the anchoring means 80 is decreased between each apex 70a, 70b, 70c and 70d and the connecting means 90.

While in the foregoing specification a detailed description of an embodiment of the invention has been set down for the purpose of illustration, it is to be understood that the invention is not intended to be limited to the specific embodiment herein shown. Accordingly, many variations of the details herein given may be made by those skilled in the art without departing from the spirit and scope of the invention.

What is claimed is:

1. A pickup truck bed cover comprising
a) a flexible sheet, the flexible sheet having a horizontal portion dimensioned so as to overlap an opening defined by two substantially vertical sidewalls, a substantially vertical end wall and a substantially vertical tailgate of a pickup truck, and the flexible sheet further having four substantially vertical draped portions extending downwardly along each of the sidewalls, end wall and tailgate;
b) a tension distribution channel running around the perimeter of the horizontal portion and diagonally down to each corner of the four substantially vertical draped portions of the flexible sheet forming four V-like formations at each of four corners, the tension distribution channels running diagonally down meeting at an apex at each of the four corners; and c) an anchoring means having a first and second end portion, the first end portion attached to the apex of the tension distribution channel, and a connecting means attached to the second end portion, wherein the anchoring means has an adjustable length to increase or decrease force with which the flexible sheet overlaps the opening of the pickup truck bed, and wherein the connecting means is removably affixed to the pickup truck;

wherein the tension distribution channel distributes force produced when the anchoring means is pulled tautly between the apex and the connecting means.

2. The cover of claim 1, wherein the flexible sheet is constructed from material selected from the group consisting of canvas, vinyl, leather, plastic, nylon, polyethylene glycol terephthalate resin, rayon or any combination thereof.

3. The cover of claim 2, wherein the flexible sheet is constructed from vinyl.

4. The cover of claim 1, wherein the tension distribution channel is constructed from canvas, vinyl, leather, plastic, nylon, polyethylene glycol terephthalate resin, rayon or any combination thereof.

5. The cover of claim 4, wherein the tension distribution channel is attached to the flexible sheet by an adhesive.

6. The cover of claim 4, wherein the tension distribution channel is attached to the flexible sheet by stitches.

7. The cover of claim 5, wherein the tension distribution channel is attached to the flexible sheet by heat melting.

8. The cover of claim 1, wherein the anchoring means is a strap which is constructed from a material that is selected from canvas, vinyl, leather, plastic, nylon, polyethylene glycol terephthalate resin, rayon or any combination thereof.

9. The cover of claim 8, wherein the strap is integrally formed as part of the tension distribution channel.

10. The cover of claim 1, wherein the connecting means is a hook structure formed to attached the underside of the pickup truck.

11. The cover of claim 10, wherein the hook is comprised of metal.

12. The cover of claim 10, wherein the hook is comprised of plastic.

13. The cover of claim 1 further comprising magnets affixed to at least one of the four substantially vertical draped portions of the flexible sheet.

14. A pickup truck bed cover comprising a) a flexible sheet, the flexible sheet having a horizontal portion dimensioned so as to overlap an opening defined by two substantially vertical sidewalls, a substantially vertical end wall and a substantially vertical tailgate of a pickup truck, and the flexible sheet further having four substantially vertical draped portions extending downwardly along each of the sidewalls, end wall and tailgate;

b) a tension distribution channel running around the perimeter of the horizontal portion and diagonally down to each corner of the four substantially vertical draped portions of the flexible sheet forming four V-like formations at each of four corners, the tension distribution channels running diagonally down meeting at an apex at each of the four corners; and c) a strap having a first and second end portion, the first end portion attached to the apex of the tension distribution channel, and a hook attached to the second end portion, wherein the strap has an adjustable length to increase or decrease force with which the flexible sheet overlaps the opening of the pickup truck bed, and wherein the hook is removably affixed to the pickup truck;

wherein the tension distribution channel distributes force produced when the strap is pulled tautly between the apex and the hook.

* * * * *